(12) United States Patent
Deng et al.

(10) Patent No.: US 12,542,338 B2
(45) Date of Patent: Feb. 3, 2026

(54) CELL AND ASSEMBLY METHOD THEREOF

(71) Applicant: JIANGSU ZENERGY BATTERY TECHNOLOGIES CO., LTD., Suzhou (CN)

(72) Inventors: Jiangnan Deng, Nanjing (CN); Chennan Liu, Nanjing (CN); Bin Jiang, Nanjing (CN); Wei Yuan, Nanjing (CN)

(73) Assignee: JIANGSU ZENERGY BATTERY TECHNOLOGIES CO., LTD., Suzhou (CN)

( * ) Notice: Subject to any disclaimer, the term of this patent is extended or adjusted under 35 U.S.C. 154(b) by 517 days.

(21) Appl. No.: 18/151,216

(22) Filed: Jan. 6, 2023

(65) Prior Publication Data
US 2023/0216163 A1    Jul. 6, 2023

Related U.S. Application Data

(63) Continuation of application No. PCT/CN2020/122736, filed on Oct. 22, 2020.

(30) Foreign Application Priority Data

Aug. 19, 2020 (CN) .......................... 202010835418.X

(51) Int. Cl.
*H01M 50/636* (2021.01)
*H01M 10/48* (2006.01)
*H01M 50/103* (2021.01)
*H01M 50/30* (2021.01)
*H01M 50/533* (2021.01)

(52) U.S. Cl.
CPC ....... *H01M 50/636* (2021.01); *H01M 10/486* (2013.01); *H01M 50/103* (2021.01); *H01M 50/30* (2021.01); *H01M 50/533* (2021.01)

(58) Field of Classification Search
CPC .. H01M 50/636; H01M 50/30; H01M 50/533; H01M 50/103; H01M 50/591; H01M 50/593; H01M 50/595
See application file for complete search history.

(56) References Cited

U.S. PATENT DOCUMENTS 10,790,544 B1 * 9/2020 Wang .................. H01M 50/207
2019/0326653 A1  10/2019 Zhang et al.

FOREIGN PATENT DOCUMENTS

CN    102104167 A    6/2011
CN    203706892 U    7/2014
(Continued)

*Primary Examiner* — Christopher P Domone

(57) ABSTRACT

A cell and an assembly method thereof. The cell has an elongated structure with a positive electrode end and a negative electrode end. The negative electrode end is provided with a liquid injection hole, a tab protector and a single-cell collection board. A negative electrode column is connected to a negative tab on a cell core set through an aluminum plate, which is bendable to be accommodated into an accommodating cavity. The liquid injection hole is sunk into an avoidance hole on a top frame plate of the tab protector to clamp the tab protector. The electrolyte flows through the accommodating cavity to fill a core cavity, and the liquid injection hole is sealed by a sealing mechanism including a steel ball welded in the liquid injection hole and a structural adhesive filled in the recess.

13 Claims, 8 Drawing Sheets

(56) References Cited

FOREIGN PATENT DOCUMENTS

| | | |
|---|---|---|
| CN | 205900334 U | 1/2017 |
| CN | 106410104 A | 2/2017 |
| CN | 107223286 A | 9/2017 |
| CN | 110518174 A | 11/2019 |
| CN | 111276663 A | 6/2020 |
| WO | WO2018231605 | * 12/2018 |

* cited by examiner

CELL AND ASSEMBLY METHOD THEREOF

CROSS-REFERENCE TO RELATED APPLICATIONS

This application is a continuation of International Patent Application No. PCT/CN2020/122736, filed on Oct. 22, 2020, which claims the benefit of priority from Chinese Patent Application No. 202010835418.X, filed on Aug. 19, 2020. The content of the aforementioned application, including any intervening amendments thereto, is incorporated herein by reference in its entirety.

TECHNICAL FIELD

This application relates to batteries or cells, and more particularly to a cell and an assembly method thereof.

BACKGROUND

Regarding the existing square cells for forming a battery pack, their positive and negative electrodes are generally located on the top. During the assembly of the battery pack, it is necessary to use an additional connector to realize the connection between cells, which is accompanied by large space consumption, leading to decline in the energy density of the whole battery pack. Chinese Patent Publications No. 102104167A and No. 110518174A both disclose an internal series-connected battery, in which the battery cell voltage is increased, and the external connector is eliminated, thereby optimizing the overall energy density of the battery pack. Essentially, the internal series-connected battery is a combination of multiple cells that are connected in series, and regarding this design, it fails to monitor the single cell. In addition, the internal series connection will lead to complicated assembly operation, and the assembly process may cause the circulation of electrolyte between the cells, resulting in battery failure.

SUMMARY

An objective of this application is to provide a cell and an assembly method thereof to overcome the defects in the prior art. This application optimizes the cell design to reduce the accessories needed in the assembly of a battery pack from cells, thereby enhancing the energy density of the battery pack, and simplifying the assembly operation of the battery pack.

Technical solutions of this application are described as follows.

In a first aspect, this application provides a cell, comprising:
  a first square-shaped frame;
  a cell core set;
  two pole covers; and
  a tab protector;
  wherein the first square-shaped frame is an elongated frame enclosed by four plates, and a core cavity is formed in the first square-shaped frame; and a first end of the core cavity has a first opening, and a second end of the core cavity has a second opening;
  the cell core set has an elongated structure, and is arranged in the core cavity; a first end of the cell core set is provided with a positive tab, and a second end of the cell core set is provided with a negative tab; the positive tab is located at the first opening, and the negative tab is located at the second opening; the first end of the cell core set is configured as a positive electrode end, and the second end of the cell core set is configured as a negative electrode end; and at the negative electrode end, a space is provided between the cell core set and the second end of the core cavity to form a first accommodating cavity;
  the tab protector is arranged in the first accommodating cavity; the tab protector comprises a top frame plate, two side frame plates, a bottom frame plate and a back frame plate; the top frame plate, the bottom frame plate and the two side frame plates form a second square-shaped frame; wherein two sides of the second square-shaped frame are each provided with an opening; the opening at a side of the second square-shaped frame is connected to the back frame plate to form a second accommodating cavity; the top frame plate, the bottom frame plate and the two side frame plates respectively cling to an inner side of the four plates of the first square-shaped frame; the back frame plate is provided with a tab hole; the back frame plate clings to an end of the negative electrode end; and the negative tab passes through the tab hole; and
  the two pole covers consists of a first pole cover and a second pole cover; the first pole cover and the second pole cover each comprise an electrode column, a connecting strip plate and a cover plate; the electrode column is provided on an outer side of the cover plate; the connecting strip plate is provided on an inner side of the cover plate; the electrode column is connected with the connecting strip plate; the cover plate of the first pole cover is covered at the first opening of the first square-shaped frame, and the cover plate of the second pole cover is covered at the second opening of the first square-shaped frame; the connecting strip plate of the first pole cover is connected to the positive tab, and the connecting strip plate of the second pole cover is connected to the negative tab through an aluminum plate; and the aluminum plate is bendable to be accommodated in the second accommodating cavity.

In an embodiment, cover plates and the first square-shaped frame are made of the same metal material; the cover plate of the first pole cover is weldedly covered at the first opening of the first square-shaped frame, and the cover plate of the second pole cover is weldedly covered at the second opening of the first square-shaped frame; the electrode column and the connecting strip plate are provided on the cover plate through an insulator; and the connecting strip plate of the first pole cover is weldedly connected to the positive tab; and the connecting strip plate of the second pole cover is weldedly connected to the aluminum plate, and the aluminum plate is weldedly connected to the negative tab.

In an embodiment, the four plates of the first square-shaped frame comprise a top plate; an end of the top plate close to the negative electrode end is provided with a liquid injection hole; the top frame plate is provided with an avoidance hole; the back frame plate is provided with a liquid permeation hole; and the liquid injection hole and the avoidance hole are coaxially arranged.

In an embodiment, the liquid injection hole is sealed by a sealing mechanism.

In an embodiment, the sealing mechanism comprises a recess and a steel ball; the recess is centered on the liquid injection hole and recesses toward the first accommodating cavity; the steel ball is arranged in the liquid injection hole; the recess is configured to be assembled in the avoidance hole, so as to allow the liquid injection hole to be correspondingly assembled in the avoidance hole; and the steel ball is in interference fit with the liquid injection hole.

In an embodiment, the recess is filled with a solidified structural adhesive.

In an embodiment, a single-cell collection board is provided on the second pole cover; the single-cell collection board comprises a back plate, a voltage detection terminal, a temperature detection terminal, a temperature sensor, a first connecting plate and a second connecting plate; the back plate clings to the cover plate; the voltage detection terminal, the temperature detection terminal, the temperature sensor, the first connecting plate and the second connecting plate are arranged on the back plate; one side of the first connecting plate clings to the electrode column of the second pole cover, and the other side of the first connecting plate is electrically connected to the voltage detection terminal; the first connecting plate is configured to realize voltage conduction; one side of the second connecting plate clings to the electrode column of the second pole cover, and the other side of the second connecting plate is connected to the temperature sensor through a heat-conducting plate; the second connecting plate is configured to realize thermal conduction; and the temperature sensor is electrically connected to the temperature detection terminal.

In an embodiment, the back plate is provided with two voltage terminal support columns and two temperature terminal support columns; the two voltage terminal support columns and the two temperature terminal support columns are vertically arranged; the voltage detection terminal is arranged at top ends of the two voltage terminal support columns; a bottom end of each of the two voltage terminal support columns is matched with the insulator and abuts against the insulator; a voltage wire groove is provided between the two voltage terminal support columns; the first connecting plate is connected to the voltage detection terminal through a voltage wire board, wherein the voltage wire board is provided in the voltage wire groove; the temperature detection terminal is provided on top ends of the two temperature terminal support columns; a bottom end of each of the two temperature terminal support columns is matched with the insulator and abuts against the insulator; one of the two temperature terminal support columns is separated from the other of the two temperature terminal support columns; a sensor groove is provided between the two temperature terminal support columns; the temperature sensor is provided in the sensor groove; a space between the two temperature terminal support columns is divided by the sensor groove into a temperature wire groove and a heat-conducting groove; the temperature sensor is connected to the temperature detection terminal through a temperature wire board in the temperature wire groove, and connected to the second connecting plate through the heat-conducting plate in the heat-conducting groove.

In an embodiment, an end of the top plate of the first square-shaped frame close to the positive electrode end is provided with an explosion-proof valve.

In an embodiment, the electrode column is provided with a buffer groove.

In a second aspect, this application provides a method of producing the cell mentioned above, comprising:
(S1) welding the aluminum plate to the negative tab; forming the recess centered on the liquid injection hole on the top plate of the first square-shaped frame wherein the recess recesses toward the first accommodating cavity; welding the connecting strip plate of the first pole cover to the positive tab; inserting the cell core set into the first square-shaped frame;

(S2) placing the tab protector in the first accommodating cavity, such that a bottom of the recess is clamped into the avoidance hole, the aluminum plate passes through the tab hole on the tab protector, and the back frame plate clings to the second end of the cell core set;

(S3) welding the connecting strip plate of the second pole cover to the aluminum plate;

(S4) pressing the second pole cover toward the first square-shaped frame, such that the aluminum plate is bent and pressed into the second accommodating cavity, and an edge of the cover plate of the first pole cover clings to an edge of the first opening of the first square-shaped frame, and an edge of the cover plate of the second pole cover clings to an edge of the second opening of the first square-shaped frame;

(S5) welding the cover plate of the first pole cover and the cover plate of the second pole cover to the first square-shaped frame;

(S6) injecting an electrolyte into the core cavity through the liquid injection hole; and (S7) sealing the liquid injection hole.

In an embodiment, the liquid injection hole is sealed through steps of:
pressing the steel ball into the liquid injection hole to form the interference fit with the liquid injection hole, such that the steel ball is clamped in the liquid injection hole; and injecting a structural adhesive to the recess.

In an embodiment, the method further comprises:
(S8) mounting a single-cell collection board on the second pole cover;
wherein the single-cell collection board comprises a back plate, a voltage detection terminal, a temperature detection terminal, a temperature sensor, a first connecting plate and a second connecting plate; the back plate clings to the cover plate of the second pole cover; the voltage detection terminal, the temperature detection terminal, the temperature sensor, the first connecting plate and the second connecting plate are arranged on the back plate; the first connecting plate and the second connecting plate are connected to the electrode column of the second pole cover; the first connecting plate is electrically connected to the voltage detection terminal; the second connecting plate is connected to the temperature sensor through a heat-conducting plate; and the temperature sensor is electrically connected to the temperature detection terminal.

Compared with the prior art, this application has the following beneficial effects.

One cell can be directly connected in series to another cell by side seam welding between connecting surfaces after the connection of electrode columns. Specifically, a positive electrode of a cell can be weldedly connected in series to a negative electrode of another cell, without needing the busbar, which not only reduces the use of accessories for the battery pack assembly, but also increases the energy density of the battery pack and simplifies the battery pack assembly.

Figure 1:
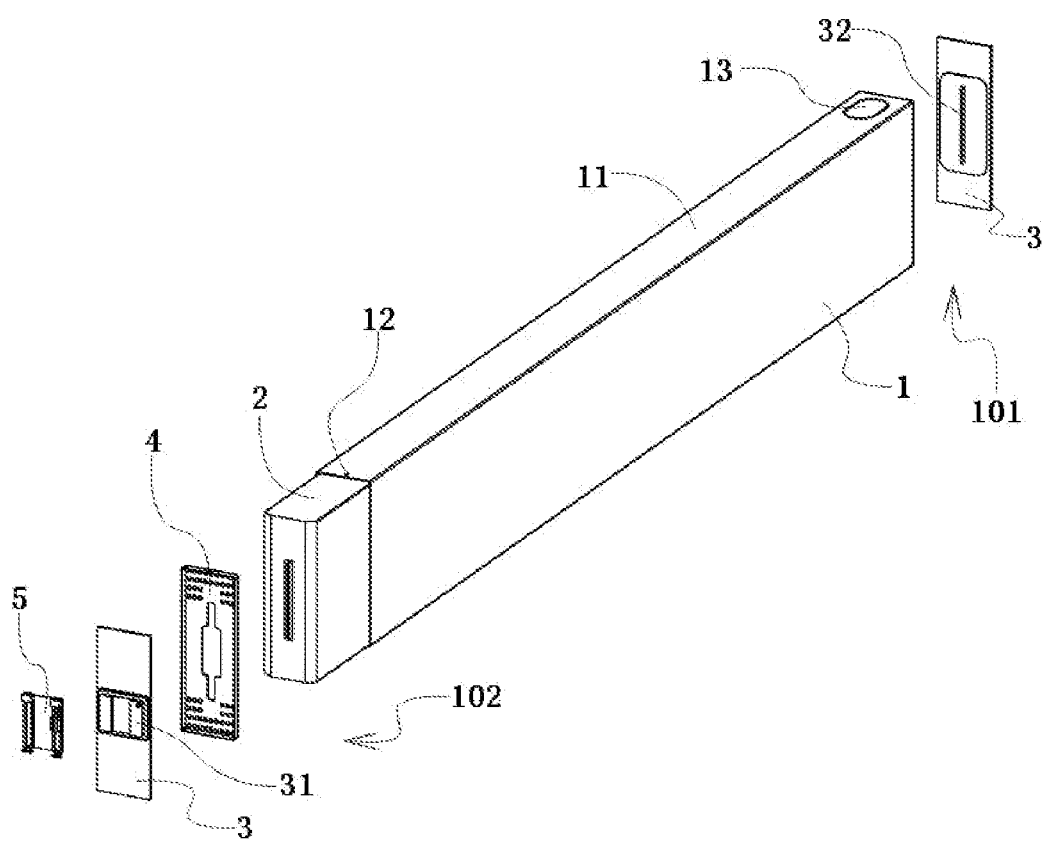
FIG. 1 an exploded view of a cell according to an embodiment of this application.

In the drawings, 1, first square-shaped frame; 2, cell core set; 3, pole cover; 4, tab protector; 5, single-cell collection board;

101, positive electrode end; 102, negative electrode end;

11, top plate; 12, liquid injection hole; 13, explosion-proof valve; 14, side plate; 15, bottom plate; 18, core cavity; 19, first accommodating cavity;

121, recess; 122, recess bottom; 123, steel ball; 124, solidified adhesive layer; 129, sealing mechanism;

21, tab; 22, aluminum plate; 22S, bent aluminum plate; 22L, straightened aluminum plate; 29, electrolyte;

31, electrode column; 311, buffer groove; 312, protrusion; 319, connecting portion; 32, connecting strip plate; 33, insulator; 331, insulation sleeve; 332, insulation plate; 333, electrode column hole; 39, cover plate; 391, welding edges; 392, insulation sleeve hole;

41, top frame plate; 411, avoidance hole; 42, side frame plate; 43, bottom frame plate; 44, back frame plate; 441, tab hole; 442, liquid-permeation hole;

51, back plate; 52, voltage detection terminal; 53, temperature detection terminal; 54, temperature sensor; 55, first connecting plate; 56, second connecting plate;

521, voltage terminal support column; 522, voltage wire groove; 523; voltage wire board; 524, first fitting portion, 531, temperature terminal support column; 532, temperature wire groove; 533, temperature wire board; 534, second fitting portion; 535, sensor groove; 541, heat-conducting groove; 542, heat-conducting plate; 551, voltage connecting plate; 552, first welding portion; 561, heat-conducting connecting plate; 562, second welding portion; and L is a length of the cell; H is a height of the cell; and D is a width of the cell.

DETAILED DESCRIPTION OF EMBODIMENTS

This application will be described in detail with reference to the accompanying drawings and the following embodiments.

Figure 2:
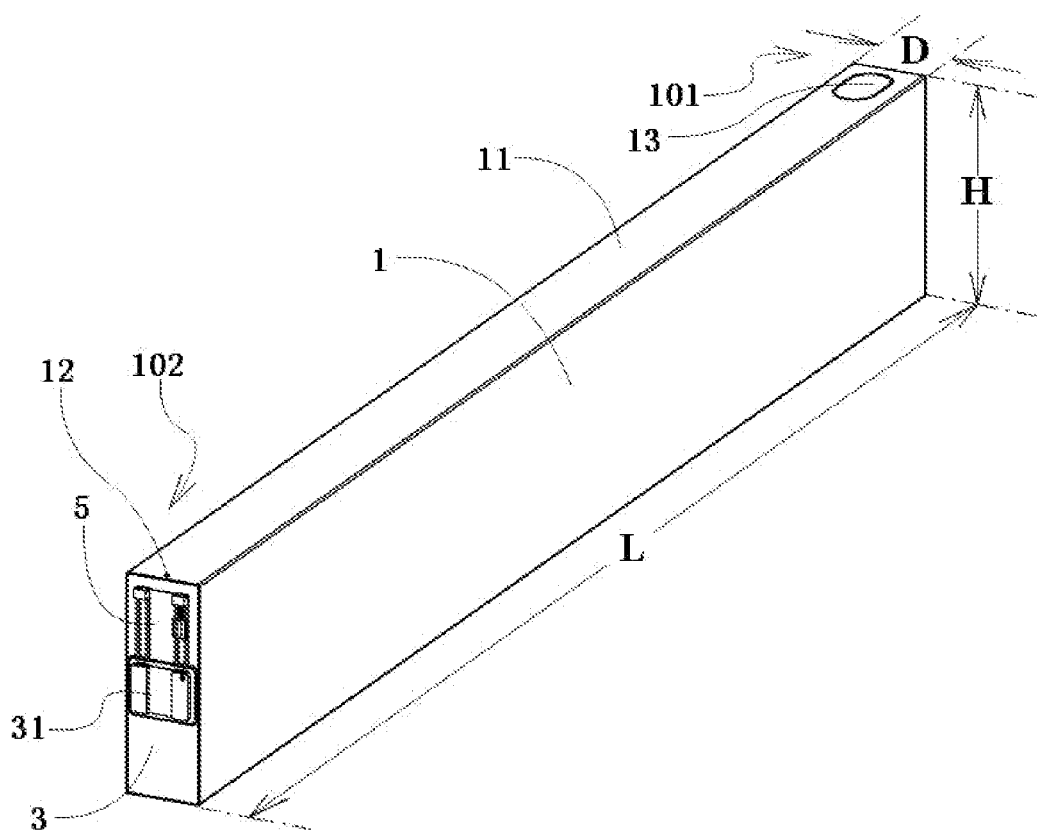
FIG. 2 is a perspective view of the cell according to an embodiment of this application.
Figure 3:
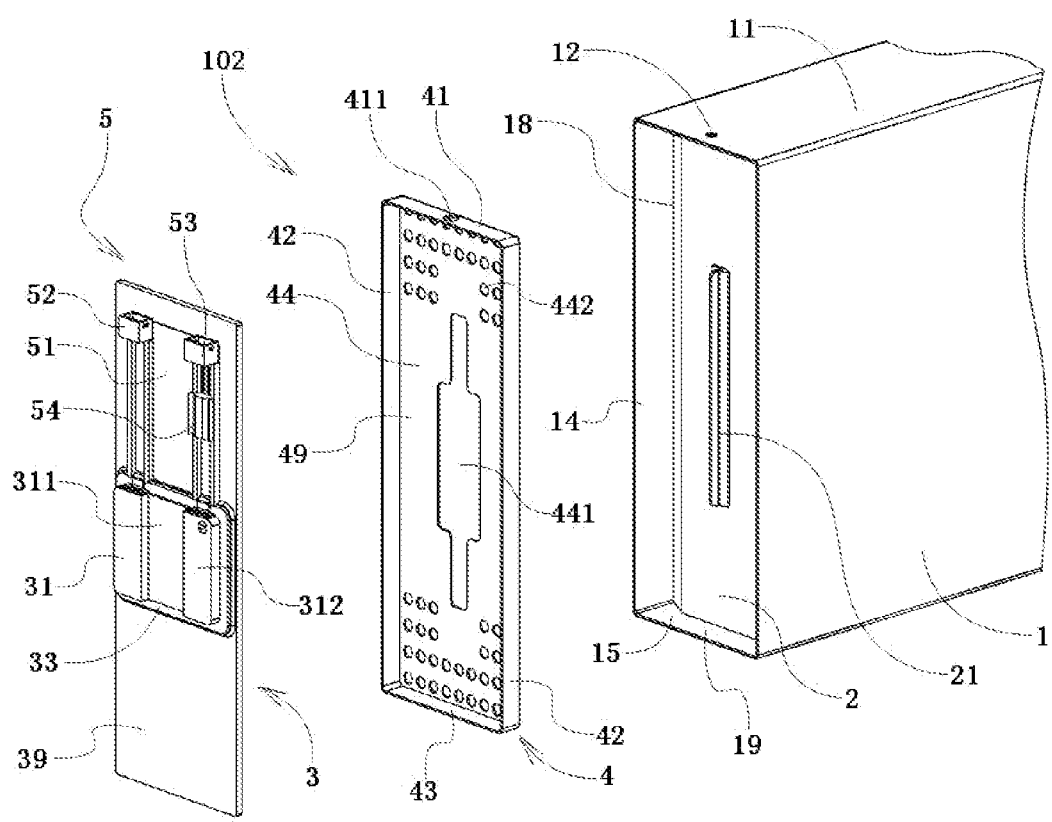
FIG. 3 is an exploded view of a negative electrode end of the cell according to an embodiment of this application.

Referring to FIGS. 1-3, a cell includes a first square-shaped frame 1, a cell core set 2, two pole covers 3 and a tab protector 4. The cell refers to the battery. The cell generally has a length L of no less than 300~2500 mm, preferably 350~1300 mm; the cell generally has a height H of 50~250 mm, preferably 70~150 mm; the cell generally has a width D of 10-150 mm, preferably 12-10 mm. The first square-shaped frame 1 is an elongated frame enclosed by four plates, and is made of metal material, preferably aluminum. The first square-shaped frame 1 has a core cavity 18 inside. A first end of the core cavity 18 has a first opening, and a second end of the core cavity 18 has a second opening The four plates include a top plate 11, two side plates 14, and a bottom plate 15, where the top plate 11 and the bottom plate 15 are arranged horizontally, the two side plates are arranged vertically, and the top plate 11 is provided with a liquid injection hole 12 and an explosion-proof valve 13.

Figure 8:
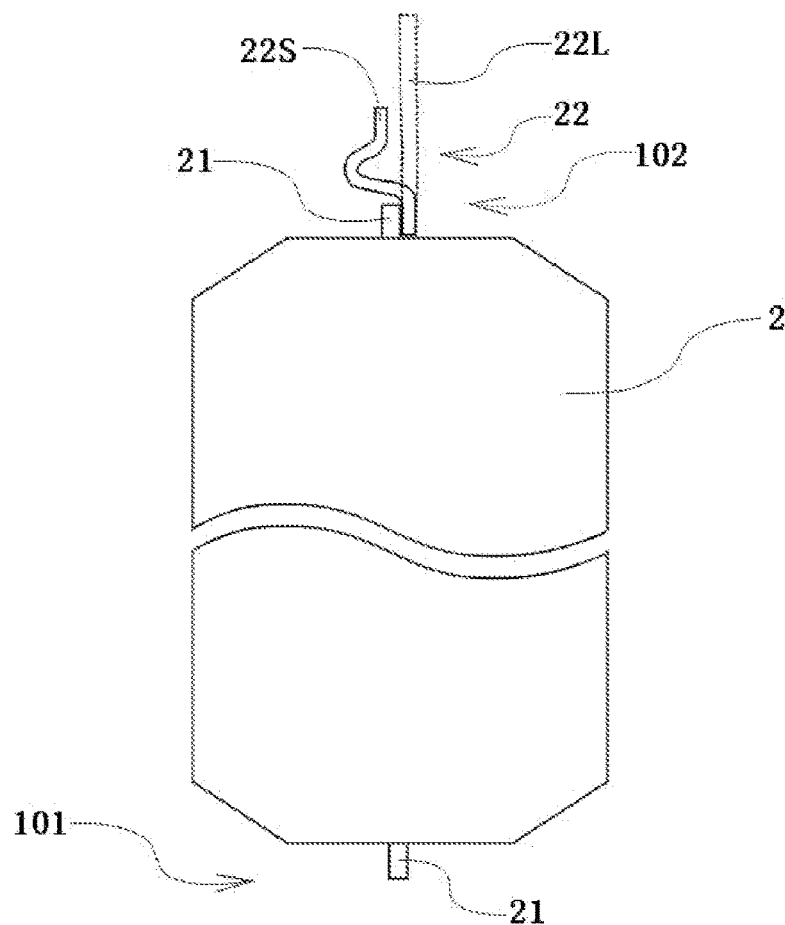
FIG. 8 schematically shows a zigzag-shaped negative tab according to an embodiment of this application.

The cell core set 2 has a long strip shape, and is arranged in the core cavity 18 of the first square-shaped frame 1. Two ends of the core cell are each provided with a tab 21. A first end of the cell core set 2 is provided with a positive tab, and a second end of the cell core set 2 is provided with a negative tab. The positive tab is located at the first opening, and the negative tab is located at the second opening. The first end of the cell core set 2 is configured as a positive electrode end 101, and the second end of the cell core set 2 is configured as a negative electrode end 102, namely the positive electrode end 101 and the negative electrode end 102 provided herein are respectively located at the two ends of the strip battery cell. The tab 21 is a plate made of multilayer copper foil or aluminum foil. In this embodiment, the positive tab at the positive electrode end 101 is generally a plate made of multilayer aluminum foil, and the negative tab at the negative electrode end 102 is generally a plate made of multilayer copper foil. Referring to FIG. 8, the negative tab at the negative electrode end 102 is weldedly connected to an aluminum plate 22. The aluminum plate 22 is a thin plate made of aluminum, which is soft and easy to be bent.

Figure 4:
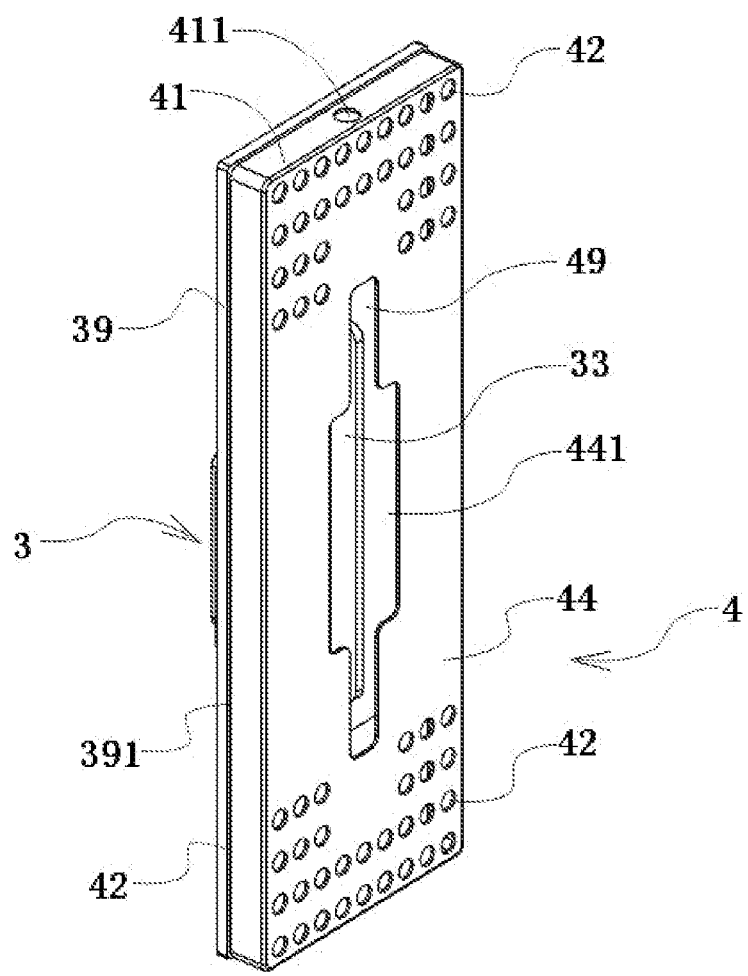
FIG. 4 schematically shows a back structure of a combination of a pole cover and a tab protector according to an embodiment of this application.
Figure 5:
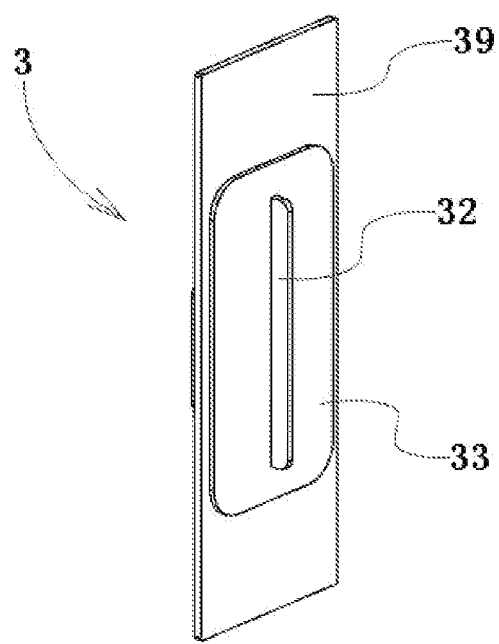
FIG. 5 schematically shows a back structure of the pole cover according to an embodiment of this application.
Figure 6:
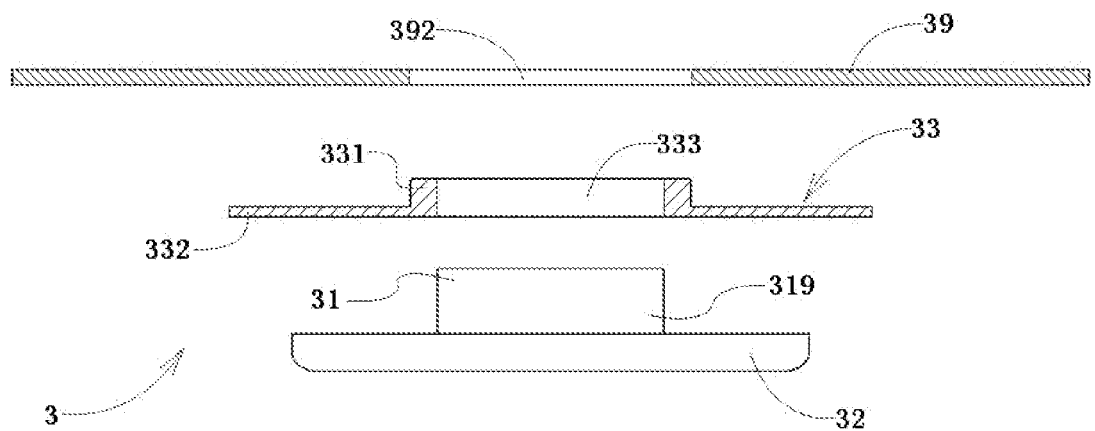
FIG. 6 is a cross-sectional view showing the exploded pole cover according to an embodiment of this application.

Referring to FIGS. 4-6, the two pole covers 3 consists of a first pole cover and a second pole cover. The first pole cover is provided at the positive electrode end 101, and the second pole cover is provided at the negative electrode end 102. The first pole cover and the second pole cover each include an electrode column 31, and a connecting strip plate 32 and a cover plate 39. The electrode column 31 is a square column. The connecting strip plate 32 is a long strip plate. The electrode column 31 and the connecting strip plate 32 are preferably made of aluminum. An insulator 33 is made of insulating material, preferably polysulfone or modified polypropylene. The cover plate 39 and the first square-shaped frame 1 are made of the same material, preferably aluminum. The electrode column 31 is connected to the connecting strip plate, and provided on the cover plate 39 through the insulator 33. Specifically, the insulator 33 includes an insulation sleeve 331, an insulation plate 332 and an electrode column hole 333. The electrode column hole 333 penetrates the insulation sleeve 331 and the insulation plate 332. The cover plate 39 is provided with an insulation sleeve hole 392. The electrode column 31 is sleeved in the electrode column hole 333 through an connecting portion 319, and the insulation sleeve 331 is sleeved in the insulation sleeve hole 392, such that the electrode column 31 is provided at an outer side of the cover plate 39, and the connecting strip plate 32 is connected to an inner side of the cover plate 39. The electrode column 31 insulates against the cover plate 39 through the insulation sleeve 331. The connecting strip plate 32 insulates against the cover plate 39 through the insulation plate 332.

The positive tab is weldedly connected to a connecting strip plate of the first pole cover, and the negative tab is connected to a connecting strip plate of the second pole cover through the aluminum plate 22, namely the connecting strip plate of the second pole cover is weldedly connected to the aluminum plate 22. The connection between the connecting strip plate 32 of the first cover pole cover and the positive tab, the connection between the negative tab and the aluminum plate 22, and the connection between the connecting strip plate of the second pole cover and the aluminum plate 22 are generally realized by ultrasonic welding, electromagnetic pulse welding or friction stir welding, preferably the friction stir welding.

At the negative electrode end 102, a space is provided between the cell core set 2 and the second end of the core cavity 18 to form a first accommodating cavity 19. The tab protector 4 is arranged in the first accommodating cavity 19. The tab protector 4 is made of insulating material, preferably polysulfone or modified polypropylene. The tab protector 4 includes a top frame plate 41, two side frame plates 42, a bottom frame plate 43 and a back frame plate 44. The top frame plate 41, the bottom frame plate 43 and the two side frame plates 42 form a second square-shaped frame, where two sides of the second square-shaped frame are each provided with an opening. The opening at a side of the second square-shaped frame is connected to the back frame plate 44 to form a second accommodating cavity 49. The top frame plate 41, the bottom frame plate 43 and the two side frame plates 42 respectively cling to an inner side of the four plates of the first square-shaped frame 1, and the back frame plate 44 clings to an end of the negative electrode end 102. Specifically, the top frame plate 41 clings to an inner side of a top plate 11 of the first square-shaped frame 1; the bottom frame plate 43 clings to an inner side of a bottom plate 15 of the first square-shaped frame 1; one of the two side frame plates 42 clings to an inner side of one of the two side plates 14 of the first square-shaped frame 1, and the other of the two side frame plates 42 clings to an inner side of the other of the two side plates 14 of the first square-shaped frame 1. The back frame plate 44 is provided with a tab hole 441. The back frame plate 44 clings to an end of the negative electrode end 102. The negative tab at the second end of the cell core set 2 penetrates the tab hole 441 to enter the second accommodating cavity 49. The negative tab is connected to the connecting strip plate of the second pole cover inside the second accommodating cavity 49, namely at the negative electrode end 102, the soft aluminum plate 22 for connecting the connecting strip plate of the second pole cover and the negative tab is bent to be accommodated into the second accommodating cavity 49.

The cover plate of the first pole cover and the cover plate of the second pole cover are respectively weldedly covered at the two openings of the first square-shaped frame 1. Specifically, the cover plate of the first pole cover and the cover plate of the second pole cover each have a length matched with a height of the first square-shaped frame 1, a width matched with a width of the first square-shaped frame 1. Referring to FIG. 4, inner edges of the cover plate 39 are welding edges 391. Four welding edges 491 at the inner side of the cover plate 39 are welded on the first square-shaped frame 1 to seal the core cavity 18. In order to facilitate the assembly, the negative tab at the negative electrode end 1-2 is a zigzag plate. Referring to 21S portion shown in FIG. 8, when assembling the negative electrode end, the negative tab on the zigzag plate of the negative electrode end 102 is straightened. Then, referring to 21L portion shown in FIG. 8, the negative tab at the negative electrode end 102 is welded on the connecting strip plate of the second pole cover, and the negative tab at the negative electrode end 102 is bent to be pressed into the second accommodating cavity 49, such that the negative tab at the negative electrode end 102 becomes the zigzag plate again, then the cover plate of the second pole cover at the negative electrode end is welded on the first square-shaped frame 1.

In this embodiment, a liquid injection hole 12 of the top plate 11 of the first square-shaped frame 1 is provided at the negative electrode end 102. An end of the top plate 11 of the first square-shaped frame 1 close to the positive electrode end 101 is provided with an explosion-proof valve 13. The top frame plate 41 is provided with an avoidance hole 411. The back frame plate 44 is provided with liquid permeation holes 442. The liquid permeation holes 442 on the back frame plate 44 are divided into two groups, where one group is located above the tab hole 441, and the other group is located below the tab hole 441. The liquid injection hole 12 and the avoidance hole 411 are coaxially arranged. After covering the two ends of the first square-shaped frame 1 by the two pole covers 3, the electrolyte is allowed to be injected into the core cavity 18 through the liquid injection hole 12, and flows into the second accommodating cavity 49 through the avoidance hole 411, and then fills the core cavity 18 through the liquid permeation hole 442 on the back frame plate 44. During electrolyte injection, the cell is generally placed inclinedly. In this state, referring to FIG. 10, the positive electrode end 101 is located at the lower end, and the negative electrode end 102 is located at the upper end, and the liquid injection hole 12 is located at the top, such that when the electrolyte 29 in the core cavity 18 overflows, the space margin in the core cavity 18 only exists at an triangle above the liquid injection hole 12. In addition, the core cavity 18 is generally evacuated via the liquid injection hole 12 before electrolyte injection.

Figure 9:
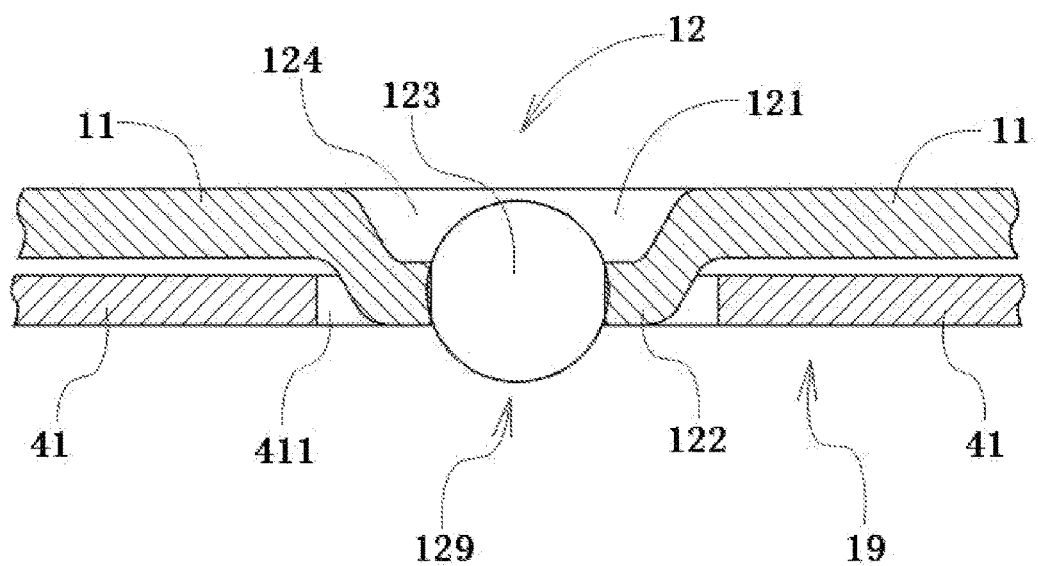
FIG. 9 schematically illustrates a sealing structure of a liquid injection hole according to an embodiment of this application.

After electrolyte injection, the liquid injection hole 12 is sealed via a sealing mechanism. As shown in FIG. 9, the sealing mechanism 129 includes a recess 121 and a steel ball 123. The recess 121 is centered on the liquid injection hole 12 and recesses toward the first accommodating cavity 19. The steel ball 123 is weldedly arranged in the liquid injection hole 12. The recess 121 is configured such that the liquid injection hole 12 is allowed to move into the avoidance hole 41. During the actual assembly, the recess 121 is usually formed before liquid injection, especially after assembling the tab protector 4 into the first accommodating cavity 19. A recess bottom 122 of the recess 121 is sunk into the avoidance hole 411 of the top frame plate 44 of the tab protector 4, such that the liquid injection hole 12 at the recess bottom 122 is moved into the avoidance hole 411. A recess bottom 122 of the recess 121 that is sunk into the avoidance hole 411 clamps the tab protector 4. The steel ball 123 is in interference fit with the liquid injection hole 12, that is, the steel ball 123 is larger than the liquid injection hole 12 in diameter. When assembling the steel ball 123, the steel ball 12 is injected into the liquid injection hole 12, such that the steel ball 123 is clamped into the liquid injection hole 12; the steel ball is welded on an edge of the liquid injection hole 12; the recess 121 is injected with structural adhesive; after the structural adhesive is solidified, the recess 121 is filled with a solidified adhesive layer 124 that is formed by the solidified structural adhesive. A top of the solidified adhesive layer 124 is flush with a top surface of the top plate 11. In this embodiment, the liquid injection hole 12 is sealed by double sealing. A first sealing is realized by the welded steel balls, and the second sealing is realized by the solidified adhesive layer 124 filled in the recess 121.

Figure 7:
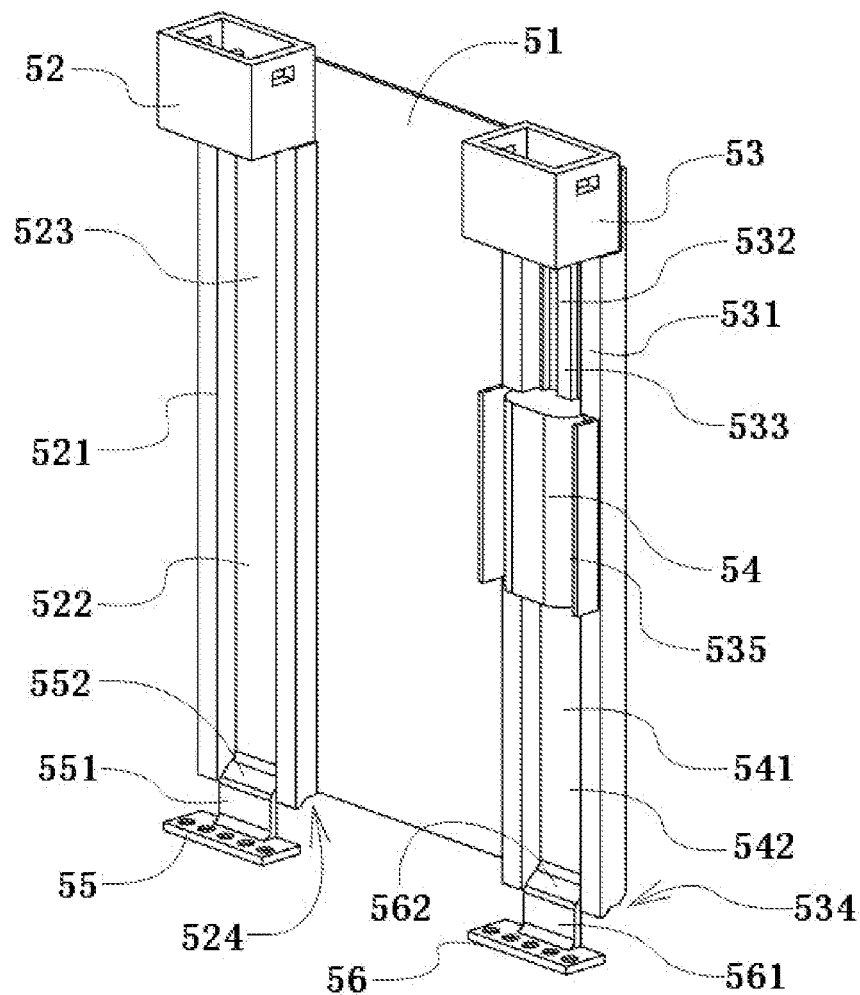
FIG. 7 is a structural diagram of a single-cell collection board according to an embodiment of this application.

In this embodiment, the negative electrode end 102 is further provided with a single-cell collection board 5. The single-cell collection board 5 is arranged on the second pole cover at the negative electrode end 102. As shown in FIGS. 3 and 7, the single-cell collection board 5 includes a back plate 51, a voltage detection terminal 52, a temperature detection terminal 53, a temperature sensor 54, a first connecting plate 55 and a second connecting plate 56. The voltage detection terminal 52 and the temperature detection terminal 53 are electric interfaces. The temperature sensor 54 preferably adopts negative temperature coefficient sensor (NTC sensor). The back plate 51 clings to the cover plate 39, and is placed vertically. The voltage detection terminal 52, the temperature detection terminal 53, the temperature sensor 54, the first connecting plate 55 and the second connecting plate 56 are arranged on the back plate 51. The voltage detection terminal 52 and the temperature detection terminal 53 are located at a top of the back plate 51, and are located at the same height. The voltage pole bonding plate 55 and the second connecting plate 56 are located at a bottom of the back plate 51, and are located at the same height. The first connecting plate 55 is electrically connected to the voltage detection terminal 52. The second connecting plate 56 is connected to the temperature sensor 54 through a heat-conducting plate 542. The temperature sensor 54 is electrically connected to the temperature detection terminal 53. The first connecting plate 55 and the second connecting plate 56 are configured for connection with the electrode column of the second cover plate.

In this embodiment, the back plate 51 is provided with two voltage terminal support columns 521 and two temperature terminal support columns 531. The two voltage terminal support columns 521 and the two temperature terminal support columns 531 are vertically arranged. The voltage detection terminal 52 is arranged at top ends of the two voltage terminal support columns 521. The temperature detection terminal 53 is provided on top ends of the two temperature terminal support columns 531. A bottom end of each of the two voltage terminal support columns 521, and a bottom end of the two temperature terminal support columns 531 are matched with the insulator and abuts against the insulator 33. Specifically, the bottom end of each of the two voltage terminal support columns 521 is provided with a first fitting portion 524. The bottom end of each of the two temperature terminal support columns 531 is provided with a second fitting portion 534. The bottom end of each of the two voltage terminal support columns 521 and the insulation sleeve 331 of the insulator 33 are in fit connection through the first fitting portion 524, and are glued through the structural adhesive. The bottom end of each of the two temperature terminal support columns 531 and the insulation sleeve 331 of the insulator 33 are in fit connection through the second fitting portion 534, and are glued through the structural adhesive.

One of the two voltage terminal support columns 521 is separated from the other of the two voltage terminal support columns 521, so that a voltage wire groove 522 is formed between the two voltage terminal support columns 521. A voltage wire board 523 is provided in the voltage wire groove 522. The first connecting plate 55 is electrically connected to the voltage detection terminal 52 through the voltage wire board 523. The first connecting plate 55 is connected to the electrode column 31. Specifically, the first connecting plate 55 is arranged horizontally, which is usually a nickel sheet. The first connecting plate 55 is welded to a cylindrical surface of the electrode column 31. The first connecting plate 55 is connected to a voltage connecting plate 551, which is arranged vertically. The voltage connecting plate 551 is in welded connection with the voltage wire board 523 through a first welding portion 552.

One of the two temperature terminal support columns 531 is separated from the other of the two temperature terminal support columns 531. A sensor groove 535 is provided between the two temperature terminal support columns 531. A space between the two temperature terminal support columns 531 is divided by the sensor groove 535 into a temperature wire groove 532 and a heat-conducting groove 541. The temperature wire groove 532 is located between the sensor groove 535 and the temperature detection terminal 53, and the heat-conducting groove 541 is located below the sensor groove 535. A temperature wire board 533 is provided in the temperature wire groove 532. The temperature sensor 54 is electrically connected to the temperature detection terminal 53 through the temperature wire board 533. A heat-conducting plate 542 is provided in the heat-conducting groove 541. The second connecting plate 56 is connected to the temperature sensor 54 through the heat-conducting plate 542. The second connecting plate 56 is connected to the electrode column 31 the second cover plate. Specifically, the second connecting plate 56 is a plate arranged horizontally, which is usually a nickel sheet. The second connecting plate 56 is welded to the cylindrical surface of the electrode column 31 the second cover plate. The second connecting plate 56 is connected to a heat-conducting connecting plate 561, which is arranged vertically. The heat-conducting connecting plate 561 is welded to the heat-conducting plate 542 through a second welding portion 562.

In an embodiment, the electrode column 31 is further provided with a buffer groove 311. The buffer groove 311 is arranged vertically. Two protrusions 312 protruding from the electrode column 31 are formed and are vertically arranged. The first connecting plate 55 is welded to a top end surface of one of the two protrusions 312, and the second connecting plate 56 is welded to a top end surface of the other of the two protrusions 312. When the electrode column 31 is connected to the busbar, the buffer groove 311 is configured as a buffer position.

A method of producing the cell mentioned above is performed through the following steps.

(S1) The aluminum plate 22 is welded to the negative tab at the second end of the cell core set 2. The recess 121 is formed centered on the liquid injection hole 12 on the top plate of the first square-shaped frame 1. The recess 121 recesses toward the first accommodating cavity 19. The connecting strip plate of the first pole cover is welded to the positive tab simultaneously. The cell core set 2 is inserted into the first square-shaped frame 1.

It should be noted that the term "simultaneously" used herein refers to that the welding of the aluminum plate 22 at the negative electrode end and the forming of the recess 121 can be performed before welding the connecting strip plate 32 of the first cover plate 3 and the positive tab, or performed before inserting the cell core set 2 into the first square-shaped frame 1, or performed after inserting the cell core set 2 into the first square-shaped frame 1. The sequence of the welding of the aluminum plate 22 at the negative electrode end and the forming of the recess 121 is not specifically limited herein, that is, the forming of the recess 121 can be performed before or after the welding of the aluminum plate 22, or the forming of the recess 121 and the welding of the aluminum plate 22 can be performed simultaneously.

In order to facilitate bending of the aluminum plate 22, the aluminum plate 22 is generally pre-bent and then straightened before welding to the negative tab. The aluminum plate 22 after straightening has creases. Subsequently, the aluminum plate 22 can be bent along the creases. When being pre-bent, the aluminum plate 22 is generally bent into a zigzag structure.

When forming the recess 121 centered on the liquid injection hole 12, the liquid injection hole 12 may be opened first, then the recess 121 may be formed centered around the liquid injection hole 12, or the recess 121 may be formed first centered on a location of the liquid injection hole 12, then the liquid injection hole 12 is opened at a center of a recess bottom 122 of the recess 121. The size of the recess 121 and the size of the liquid injection hole 12 are set according to actual requirements.

(S2) The tab protector 4 is placed in the first accommodating cavity 19, such that a bottom of the recess 121 is clamped into the avoidance hole 411, the aluminum plate passes through the tab hole 441 on the tab protector 4, and the back frame plate 44 clings to an end of the negative electrode end 102. The bottom of the recess 121 is clamped into the avoidance hole 411, that is, the recess bottom 122 is clamped into the avoidance hole 411, and the liquid injection hole 12 is moved into the avoidance hole 411. It should be noted that the tab protector 4 is in interference fit with the first accommodating cavity 19.

(S3) The connecting strip plate of the second pole cover is welded to the aluminum plate 22.

(S4) The second pole cover is pressed toward the first square-shaped frame 1, such that the aluminum plate 22 is bent and pressed into the second accommodating cavity 49, and an edge of the cover plate of the first pole cover clings to an edge of the of the first opening of the first square-shaped frame 1, and an edge of the cover plate of the second pole cover clings to an edge of the second opening of the first square-shaped frame 1. In this embodiment, since the aluminum plate 22 is pre-bent in step (Si), the aluminum plate 22 can be bent along the creases, when the second pole cover at the negative electrode end is pressed to the first square-shaped frame 1.

(S5) The cover plate of the first pole cover and the cover plate of the second pole cover are respectively welded to the first square-shaped frame 1 by side seam welding.

Figure 10:
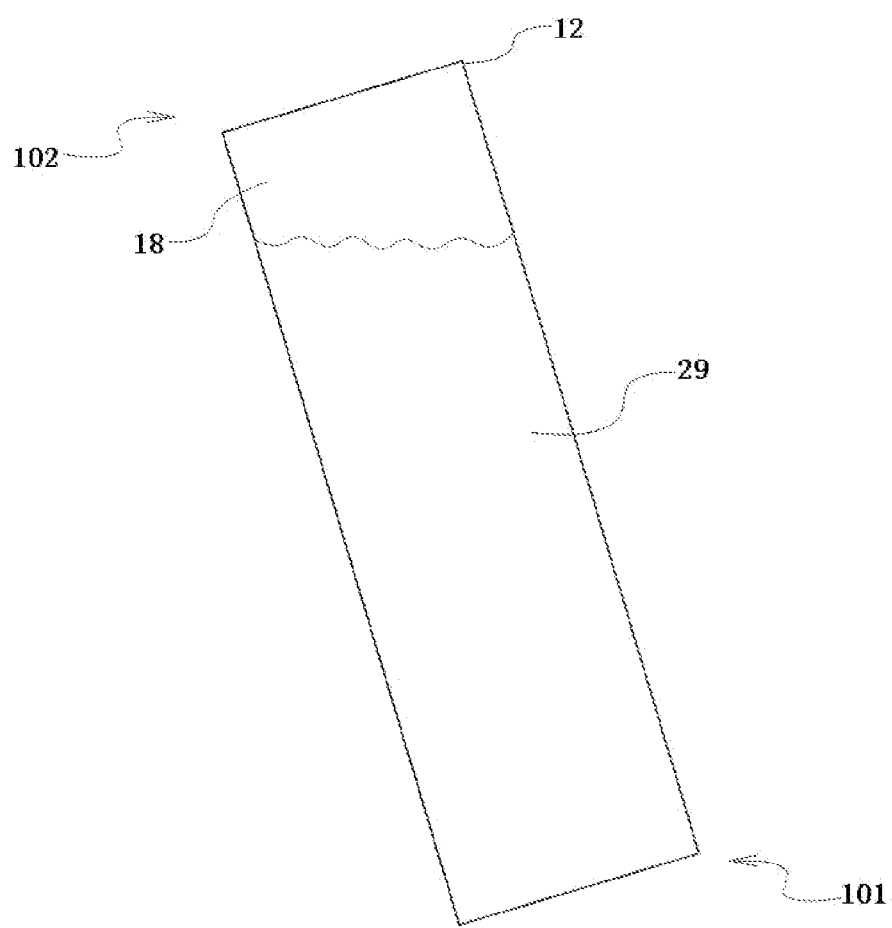
FIG. 10 schematically shows the liquid injection of the cell through the liquid injection hole according to an embodiment of this application.

(S6) An electrolyte is injected into the cell through the liquid injection hole 12. During electrolyte injection, the cell is generally placed inclinedly. Referring to FIG. 10, the positive electrode end 101 is located at the lower end of the cell, and the negative electrode end 102 is located at the upper end of the cell. The core cavity 18 is generally vacuumized via the liquid injection hole 12 before the electrolyte injection.

(S7) The liquid injection hole 12 is sealed. When the liquid injection hole 12 is sealed, the steel ball 123 is injected into the liquid injection hole 12, such that the steel ball 123 is clamped into the liquid injection hole 12. The steel ball 123 is in interference fit with the liquid injection hole 12. Then, the recess 121 is injected with structural adhesive. After the structural adhesive is solidified, the recess 121 is filled with a solidified adhesive layer 124 that is formed by the solidified structural adhesive. The solidified adhesive layer 124 is flush with the top plate 11, such that the solidified adhesive layer 124 is formed in the recess 121.

(S8) A single-cell collection board 5 is mounted on the second pole cover. During mounting, the structural adhesive is glued on the corresponding positions of the second cover plate 39 and the insulation sleeve 331, and then the back plate 51 is glued on the second cover plate 39; the bottom end of each of the two voltage terminal support columns 521 and the bottom end of each of the two temperature terminal support columns 531 are glued to the insulation sleeve 331, such that the first connecting plate 55 clings to a top end surface of one of the two protrusions 312, and the second connecting plate 56 clings to a top end surface of the other of the two protrusions 312; then, the first connecting plate 55 and the second connecting plate 56 are respectively welded on the electrode column 31 by laser welding.

What is claimed is:

1. A cell, comprising:
a first square-shaped frame;
a cell core set;
two pole covers; and
a tab protector;
wherein the first square-shaped frame is an elongated frame enclosed by four plates, and a core cavity is formed in the first square-shaped frame; and a first end of the core cavity has a first opening, and a second end of the core cavity has a second opening;
the cell core set has an elongated structure, and is arranged in the core cavity; a first end of the cell core set is provided with a positive tab, and a second end of the cell core set is provided with a negative tab; the positive tab is located at the first opening, and the negative tab is located at the second opening; the first end of the cell core set is configured as a positive electrode end, and the second end of the cell core set is configured as a negative electrode end; and at the negative electrode end, a space is provided between the cell core set and the second end of the core cavity to form a first accommodating cavity;
the tab protector is arranged in the first accommodating cavity; the tab protector comprises a top frame plate, two side frame plates, a bottom frame plate and a back frame plate; the top frame plate, the bottom frame plate and the two side frame plates form a second square-shaped frame; wherein two sides of the second square-shaped frame are each provided with an opening; the opening at a side of the second square-shaped frame is connected to the back frame plate to form a second accommodating cavity; the top frame plate, the bottom frame plate and the two side frame plates respectively cling to an inner side of the four plates of the first square-shaped frame; the back frame plate is provided with a tab hole; the back frame plate clings to an end of the negative electrode end; and the negative tab passes through the tab hole; and
the two pole covers consists of a first pole cover and a second pole cover; the first pole cover and the second pole cover each comprise an electrode column, a connecting strip plate and a cover plate; the electrode column is provided on an outer side of the cover plate; the connecting strip plate is provided on an inner side of the cover plate; the electrode column is connected with the connecting strip plate; the cover plate of the first pole cover is covered at the first opening of the first square-shaped frame, and the cover plate of the second pole cover is covered at the second opening of the first square-shaped frame; the connecting strip plate of the first pole cover is connected to the positive tab, and the connecting strip plate of the second pole cover is connected to the negative tab through an aluminum plate; and the aluminum plate is bendable to be accommodated in the second accommodating cavity.

2. The cell of claim 1, wherein the cover plates and the first square-shaped frame are made of the same metal material; the cover plate of the first pole cover is weldedly covered at the first opening of the first square-shaped frame, and the cover plate of the second pole cover is weldedly covered at the second opening of the first square-shaped frame; the electrode column and the connecting strip plate are provided on the cover plate through an insulator; the connecting strip plate of the first pole cover is weldedly connected to the positive tab; and the connecting strip plate of the second pole cover is weldedly connected to the aluminum plate, and the aluminum plate is weldedly connected to the negative tab.

3. The cell of claim 2, wherein the four plates of the first square-shaped frame comprise a top plate; an end of the top plate close to the negative electrode end is provided with a liquid injection hole; the top frame plate is provided with an avoidance hole; the back frame plate is provided with a liquid permeation hole; and the liquid injection hole and the avoidance hole are coaxially arranged.

4. The cell of claim 3, wherein the liquid injection hole is sealed by a sealing mechanism.

5. The cell of claim 4, wherein the sealing mechanism comprises a recess and a steel ball; the recess is centered on the liquid injection hole and recesses toward the first accommodating cavity; the steel ball is arranged in the liquid injection hole; the recess is configured to be assembled in the avoidance hole, so as to allow the liquid injection hole to be correspondingly assembled in the avoidance hole; and the steel ball is in an interference fit with the liquid injection hole.

6. The cell of claim 5, wherein the recess is filled with a solidified structural adhesive.

7. The cell of claim 2, wherein a single-cell collection board is provided on the second pole cover; the single-cell collection board comprises a back plate, a voltage detection terminal, a temperature detection terminal, a temperature sensor, a first connecting plate and a second connecting plate; the back plate clings to the cover plate; the voltage detection terminal, the temperature detection terminal, the temperature sensor, the first connecting plate and the second connecting plate are arranged on the back plate; one side of the first connecting plate clings to the electrode column of the second pole cover, and the other side of the first connecting plate is electrically connected to the voltage detection terminal; the first connecting plate is configured to realize voltage conduction; one side of the second connecting plate clings to the electrode column of the second pole cover, and the other side of the second connecting plate is connected to the temperature sensor through a heat-conducting plate; the second connecting plate is configured to realize thermal conduction; and the temperature sensor is electrically connected to the temperature detection terminal.

8. The cell of claim 7, wherein the back plate is provided with two voltage terminal support columns and two temperature terminal support columns; the two voltage terminal support columns and the two temperature terminal support columns are vertically arranged; the voltage detection terminal is arranged at top ends of the two voltage terminal support columns; a bottom end of each of the two voltage terminal support columns is matched with the insulator and abuts against the insulator; a voltage wire groove is provided between the two voltage terminal support columns; the first connecting plate is connected to the voltage detection terminal through a voltage wire board, wherein the voltage wire board is provided in the voltage wire groove; the temperature detection terminal is provided on top ends of the two temperature terminal support columns; a bottom end of each of the two temperature terminal support columns is matched with the insulator and abuts against the insulator; one of the two temperature terminal support columns is separated from the other of the two temperature terminal support columns; a sensor groove is provided between the two temperature terminal support columns; the temperature sensor is provided in the sensor groove; a space between the two temperature terminal support columns is divided by the sensor groove into a temperature wire groove and a heat-conducting groove; the temperature sensor is connected to the temperature detection terminal through a temperature wire board in the temperature wire groove, and connected to the second connecting plate through the heat-conducting plate in the heat-conducting groove.

9. The cell of claim 3, wherein an end of the top plate of the first square-shaped frame close to the positive electrode end is provided with an explosion-proof valve.

10. The cell of claim 3, wherein the electrode column is provided with a buffer groove.

11. A method of producing the cell of claim 6, comprising:
(S1) welding the aluminum plate to the negative tab; forming the recess centered on the liquid injection hole on the top plate of the first square-shaped frame, wherein the recess recesses toward the first accommodating cavity; welding the connecting strip plate of the first pole cover to the positive tab; inserting the cell core set into the first square-shaped frame;
(S2) placing the tab protector in the first accommodating cavity, such that a bottom of the recess is clamped into the avoidance hole, the aluminum plate passes through the tab hole on the tab protector, and the back frame plate clings to the second end of the cell core set;
(S3) welding the connecting strip plate of the second pole cover to the aluminum plate;
(S4) pressing the second pole cover toward the first square-shaped frame, such that the aluminum plate is bent and pressed into the second accommodating cavity, and an edge of the cover plate of the first pole cover clings to an edge of the first opening of the first square-shaped frame, and an edge of the cover plate of the second pole cover clings to an edge of the second opening of the first square-shaped frame;
(S5) welding the cover plate of the first pole cover and the cover plate of the second pole cover to the first square-shaped frame;
(S6) injecting an electrolyte into the core cavity through the liquid injection hole; and
(S7) sealing the liquid injection hole.

12. The method of claim 11, wherein the liquid injection hole is sealed through steps of:
pressing the steel ball into the liquid injection hole to form the interference fit with the liquid injection hole, such that the steel ball is clamped in the liquid injection hole; and injecting a structural adhesive to the recess.

13. The method of claim 11, further comprising:
(S8) mounting a single-cell collection board on the second pole cover;
wherein the single-cell collection board comprises a back plate, a voltage detection terminal, a temperature detection terminal, a temperature sensor, a first connecting plate and a second connecting plate; the back plate clings to the cover plate of the second pole cover; the voltage detection terminal, the temperature detection terminal, the temperature sensor, the first connecting plate and the second connecting plate are connected to the electrode column of the second pole cover; the first connecting plate is electrically connected to the voltage detection terminal; the second connecting plate is connected to the temperature sensor through a heat-conducting plate; and the temperature sensor is electrically connected to the temperature detection terminal.

* * * * *